US008893578B2

(12) United States Patent
Kinoshita et al.

(10) Patent No.: US 8,893,578 B2
(45) Date of Patent: *Nov. 25, 2014

(54) PARALLEL ROBOT PROVIDED WITH WRIST SECTION HAVING THREE DEGREES OF FREEDOM

(75) Inventors: Satoshi Kinoshita, Yamanashi (JP); Hikaru Yamashiro, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 550 days.

This patent is subject to a terminal disclaimer.

(21) Appl. No.: 13/238,199

(22) Filed: Sep. 21, 2011

(65) Prior Publication Data

US 2012/0060637 A1 Mar. 15, 2012

Related U.S. Application Data

(63) Continuation-in-part of application No. 12/704,027, filed on Feb. 11, 2010, now Pat. No. 8,109,173.

(30) Foreign Application Priority Data

Feb. 13, 2009 (JP) ................................. 2009-030876

(51) Int. Cl.
*B25J 17/02* (2006.01)
*B25J 9/00* (2006.01)

(52) U.S. Cl.
CPC .......... *B25J 17/0266* (2013.01); *B25J 17/0283* (2013.01); *B25J 9/0051* (2013.01); *Y10S 901/15* (2013.01); *Y10S 901/26* (2013.01); *Y10S 901/29* (2013.01)
USPC ............... 74/490.06; 901/15; 901/26; 901/29

(58) Field of Classification Search
CPC ... B25J 9/0051; B25J 17/0283; B25J 17/0266
USPC ................. 74/490.01–490.06; 901/15, 26, 29
See application file for complete search history.

(56) References Cited

U.S. PATENT DOCUMENTS 3,826,383 A 7/1974 Richter
4,548,097 A 10/1985 Zimmer (Continued)

FOREIGN PATENT DOCUMENTS

DE 2226407 A1 12/1973
DE 201988 8/1983

(Continued)

OTHER PUBLICATIONS

Office Action corresponding to DE102010007631.7, dated May 25, 2012.

(Continued)

*Primary Examiner* — David M Fenstermacher
*Assistant Examiner* — Terence Boes
(74) *Attorney, Agent, or Firm* — Lowe Hauptman & Ham, LLP

(57) ABSTRACT

A parallel robot includes a movable-section drive mechanism, and a wrist-section drive mechanism. The wrist section includes a first rotary member supported on the movable section and rotatable about a fourth rotation axis different from axes of the three-axis translational motion of the movable section, a second rotary member connected to the first rotary member and rotatable about a fifth rotation axis orthogonal to the fourth rotation axis, and a third rotary member connected to the second rotary member and rotatable about a sixth rotation axis orthogonal to the fifth rotation axis. The third rotary member is provided with an attachment surface to which a tool is attached. The attachment surface is inclined with respect to the sixth rotation axis at a predetermined angle.

1 Claim, 11 Drawing Sheets

(56) References Cited

U.S. PATENT DOCUMENTS

| | | | | |
|---|---|---|---|---|
| 6,235,282 | B1 | 5/2001 | Riviere et al. | |
| 6,543,987 | B2 | 4/2003 | Ehrat | |
| 6,896,473 | B2 | 5/2005 | Schuler | |
| 8,109,173 | B2 * | 2/2012 | Kinoshita et al. | 74/490.06 |
| 2003/0064816 | A1 | 4/2003 | Schuler | |
| 2010/0186534 | A1 | 7/2010 | Kinoshita et al. | |

FOREIGN PATENT DOCUMENTS

| | | | |
|---|---|---|---|
| DE | 102004033329 | A1 | 2/2006 |
| EP | 1854591 | A1 | 11/2007 |
| JP | 60114489 | A | 6/1985 |
| JP | 60172491 | A | 9/1985 |
| JP | 6226680 | A | 8/1994 |
| JP | 2000046140 | A | 2/2000 |
| JP | 2001038671 | A | 2/2001 |
| JP | 4045310 | A | 2/2008 |
| JP | 2008531931 | A | 8/2008 |
| JP | 2008286363 | A | 11/2008 |
| WO | 2006084743 | A1 | 8/2006 |

OTHER PUBLICATIONS

Office Action for CN2010101156574 dated Sep. 15, 2011.

Notice of Reasons for Rejection for Application No. JP2009-030876 issued Jun. 15, 2010.

Notice of Reasons for Rejection for Application No. JP2009-030876 issued Aug. 17, 2010.

* cited by examiner

PARALLEL ROBOT PROVIDED WITH WRIST SECTION HAVING THREE DEGREES OF FREEDOM

CROSS REFERENCE TO RELATED APPLICATION

This application is a continuation-in-part application of Ser. No. 12/704,027 filed on Feb. 11, 2010, which claims priority to Japanese Application No. 2009-030876 filed Feb. 13, 2009, the disclosures of which are incorporated by reference herein in their entirety.

BACKGROUND OF THE INVENTION

1. Field of the Invention

The present invention relates to a parallel robot provided with a wrist section having three degrees of freedom.

2. Description of the Related Art

Various types of parallel robots, in which a plurality of actuators (e.g., servo-motors) are attached to a stationary member acting as a base section and links joined to the output parts of the actuators are respectively driven so as to control the position and orientation of a movable section attached to the distal end of each link, have been known in the art. A parallel robot has a configuration in which the base section is connected to a movable section by a plurality of assembled-link structures arranged in parallel, and thereby has characteristics, such as high accuracy, high stiffness, high speed, high output, etc. Because of these characteristics, a parallel robot may be used as a robot for high speed handling or assembling.

FIG. 11 illustrates the parallel robot described in Japanese Examined Patent Publication (kokai) No. 4-45310 (JP4-45310B). The illustrated parallel robot has a configuration referred to as a delta-type, and includes a single base member 200 and a single movable member 208.

The base member 200 is provided with three rotary actuators 213. Each of the rotary actuators 213 includes a single stationary portion 203 formed integrally with the base member 200. The rotary shafts 202 of the three rotary actuators 213 are disposed in an identical plane. Each of three driving links 204 is fixedly attached at one end 215 thereof to each rotary shaft 202. The other end 216 of each driving link 204 is joined to two driven links 205*a*, 205*b* through two Cardan-type double joints 206*a*, 206*b*.

The two driven links 205*a*, 205*b* in each assembled-link structure are joined to the movable member 208 through two Cardan-type double joints 207*a*, 207*b*. As a result, it is possible to control the motion of the movable member 208 while controlling the operation of the driving links 204, so as to allow the movable member 208 to perform a three-axis translational motion. A working member (hereinafter referred to as a tool) such as a hand 209, etc., may be mounted on the movable member 208.

An orientation changing axis (referred to as a fourth axis) 200A for changing the orientation of the tool, such as the hand 209, etc., is set in the movable member 208 so as to extend orthogonally to the major surface of the movable member 208. The tool, such as the hand 209, etc., is driven for rotation through a telescopic arm 214 by a rotary motor 211 mounted on the base member 200. The three actuators 213 and the rotary motor 211 are controlled by a controller 212.

The parallel robot disclosed in JP4-45310B is provided with the orientation changing axis 200A, referred to as the fourth axis, for changing the orientation of the tool, such as the hand 209, etc., disposed on the movable member 208.

However, it is difficult to perform a task for mounting a workpiece to an inclined surface only by a single orientation changing axis (i.e., the fourth axis).

SUMMARY OF THE INVENTION

The present invention provides, as one aspect, a parallel robot having an increased number of degrees of freedom, which can prevent the occurrence of a singular state where a robot movement for disposing a tool mounted on a movable section at a target position and orientation cannot be unambiguously programmed.

One aspect of the present invention provides a parallel robot comprising a base section; a movable section capable of moving with respect to the base section; a movable-section drive mechanism having a parallel mechanism configuration and provided between the base section and the movable section, the movable-section drive mechanism operating to allow the movable section to perform a three-axis translational motion with respect to the base section; a wrist section provided in the movable section in a manner capable of changing an orientation of the wrist section; and a wrist-section drive mechanism operating to allow the wrist section to perform a three-axis orientation-changing motion with respect to the movable section. The wrist section comprises a first rotary member supported on the movable section and rotatable about a fourth rotation axis different from axes of the three-axis translational motion of the movable section; a second rotary member connected to the first rotary member and rotatable about a fifth rotation axis orthogonal to the fourth rotation axis; and a third rotary member connected to the second rotary member and rotatable about a sixth rotation axis orthogonal to the fifth rotation axis. The third rotary member is provided with an attachment surface to which a tool is attached. The attachment surface is inclined with respect to the sixth rotation axis at a predetermined angle.

Another aspect of the present invention provides a parallel robot comprising a base section; a movable section capable of moving with respect to the base section; a movable-section drive mechanism having a parallel mechanism configuration and provided between the base section and the movable section, the movable-section drive mechanism operating to allow the movable section to perform a three-axis translational motion with respect to the base section; a wrist section provided in the movable section in a manner capable of changing an orientation of the wrist section; and a wrist-section drive mechanism operating to allow the wrist section to perform a three-axis orientation-changing motion with respect to the movable section. The wrist section comprises a first rotary member supported on the movable section and rotatable about a fourth rotation axis different from axes of the three-axis translational motion of the movable section; a second rotary member connected to the first rotary member and rotatable about a fifth rotation axis orthogonal to the fourth rotation axis; a third rotary member connected to the second rotary member and rotatable about a sixth rotation axis orthogonal to the fifth rotation axis; and a first input shaft member, a second input shaft member and a third input shaft member, rotatably supported on the movable section and connected respectively to the first rotary member, the second rotary member and the third rotary member through gears. The wrist-section drive mechanism comprises a first servo-motor, a second servo-motor and a third servo-motor, which are carried on the base section and respectively generate driving force to drive the wrist section for rotation; and a first transmission member, a second transmission member and a third transmission member, transmitting the driving force of the first servo-motor, the second servo-motor and the third servo-motor, respectively to the first input shaft member, the second input shaft member and the third input shaft member. The first servo-motor, the second servo-motor and the third servo-motor respectively drive the first rotary member, the second rotary member and the third rotary member for rotation.

BRIEF DESCRIPTION OF THE DRAWINGS

The objects, features and advantages of the present invention will become more apparent from the following description of the preferred embodiments in connection with the accompanying drawings, wherein:

FIGS. 8A and 8B are illustrations explaining a structure of the wrist section of FIG. 5, in which FIG. 8B is a sectional view taken along a line VIII-VIII of FIG. 8A;

FIGS. 9A and 9B are enlarged sectional views of a major portion of a wrist-section drive mechanism of the parallel robot of FIG. 6, wherein FIG. 9A is a vertical sectional view depicting a holder assembly and FIG. 9B is another vertical sectional view depicting the holder assembly;

DETAILED DESCRIPTION

Figure 1:
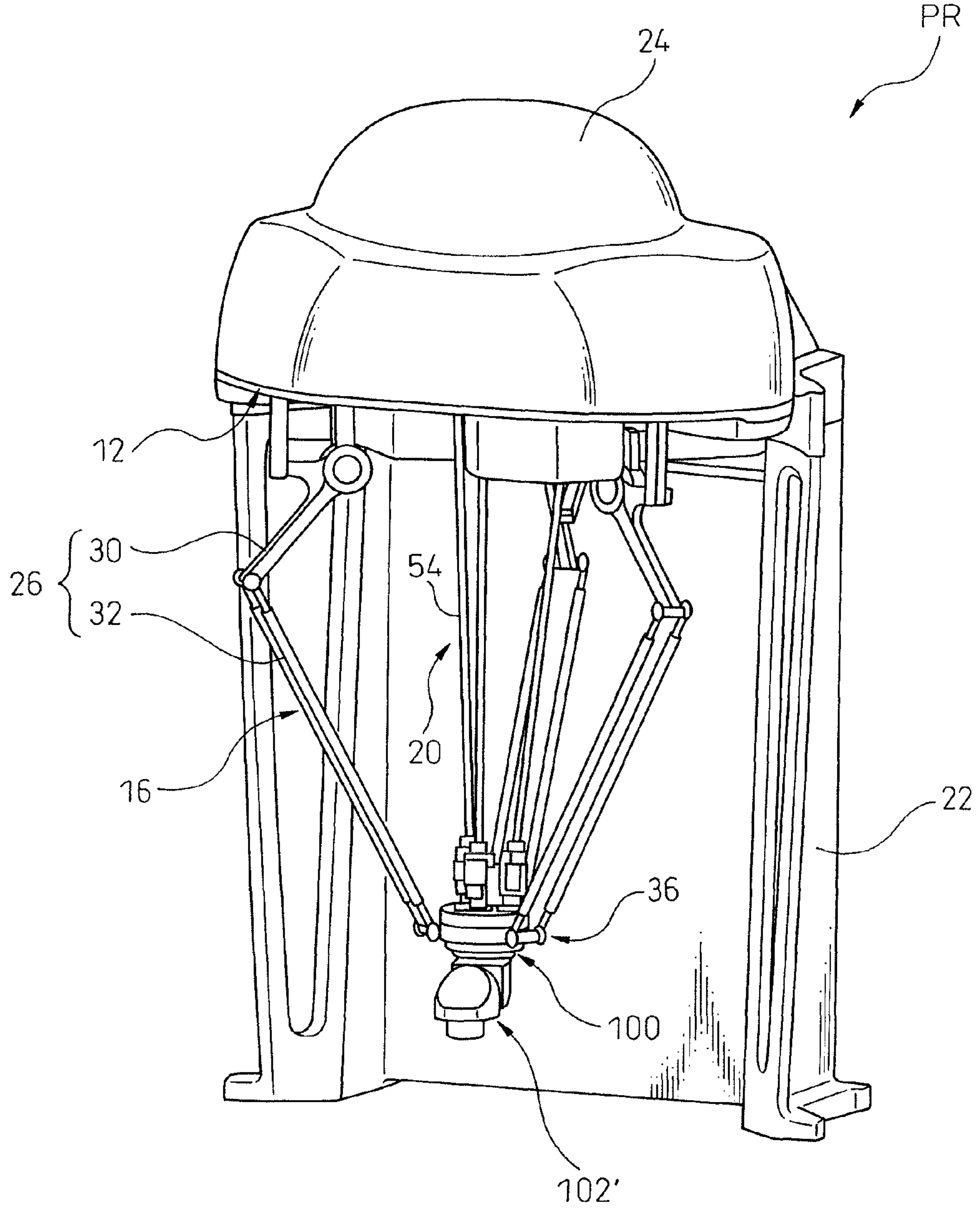
FIG. 1 is a perspective view of a parallel robot including a wrist section having three degrees of freedom.

The embodiments of the present invention are described below, in detail, with reference to the accompanying drawings. In the drawings, same or similar components are denoted by common reference numerals.

Referring to the drawings, FIGS. 1 to 4 schematically depict a configuration of a parallel robot PR provided with a wrist section having three degrees of freedom, which is described in another application prior to the present application. The parallel robot PR includes a base section 12; a movable section 100 capable of moving with respect to the base section 12; a movable-section drive mechanism 16 having a parallel mechanism configuration and provided between the base section 12 and the movable section 100, the movable-section drive mechanism 16 operating to allow the movable section 100 to perform a three-axis translational motion with respect to the base section 12; a wrist section 102' provided in the movable section 100 in a manner capable of changing the orientation of the wrist section; and a wrist-section drive mechanism 20 operating to allow the wrist section 102' to perform a three-axis orientation-changing motion with respect to the movable section 100. The parallel robot PR is configured so that the movable section 100 performs only the three-axis translational motion with respect to the base section 12 (in other words, the parallel robot PR is provided with a parallel mechanism having three degrees of freedom).

The base section 12 is formed of a plate-like structure fixedly provided in a laterally and horizontally projecting manner at the top of an arcuate standing wall 22 placed on a mounting surface for the parallel robot PR. The base section 12 is configured as a stationary member for carrying several components of the movable-section drive mechanism 16 and the wrist-section drive mechanism 20 described below. A cover 24 is securely and removably attached to the upper side of the base section 12 to cover drive motors, power transmission mechanisms, etc.

Figure 2:
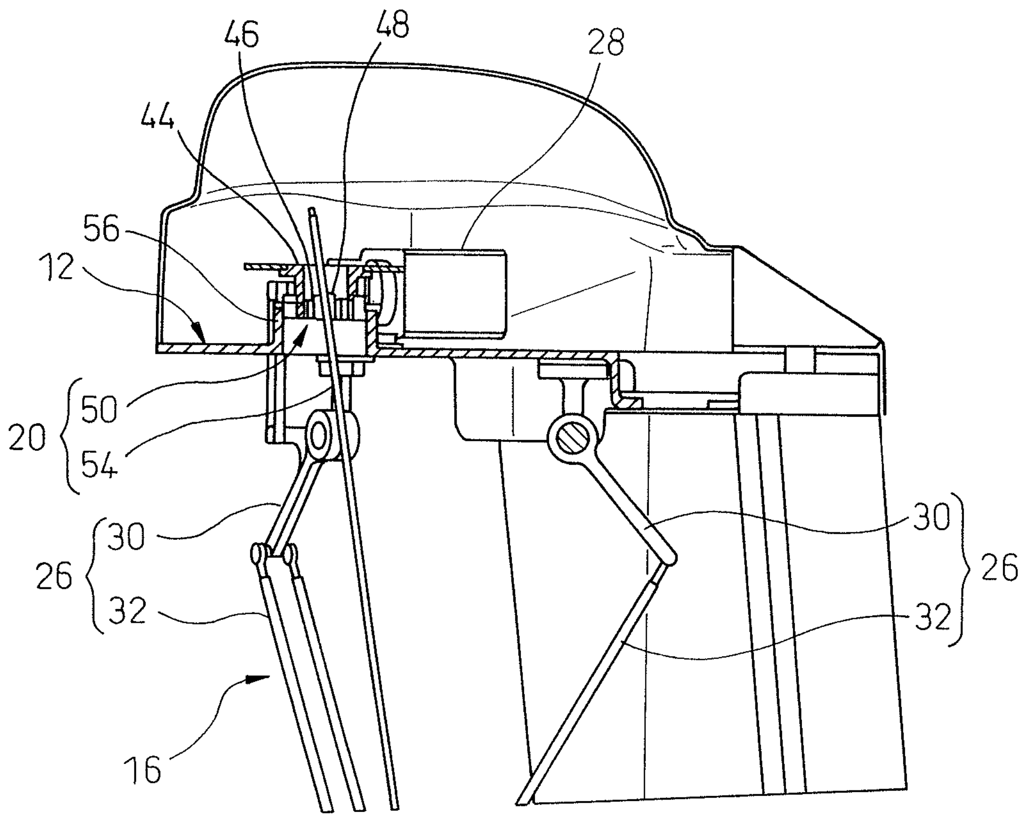
FIG. 2 is a schematic vertical sectional view of a part of the parallel robot of FIG. 1.

The movable-section drive mechanism 16 includes three assembled-link structures 26 arranged in parallel, and three servo-motors 28 (only one motor is depicted in FIG. 2) for respectively driving the assembled-link structures 26. Each assembled-link structure 26 includes a driving link 30 articulately connected to the base section 12 and the output part of a corresponding servo-motor 28 through a plurality of revolute pairs (or hinge joints) and an auxiliary link, and a parallel pair of driven links 32 articulately connected to the distal end of the driving link 30 through a revolute pair. The parallel driven links 32 are articulately connected at the distal ends thereof to the movable section 100 through a revolute pair. More specifically, universal joints (each including, e.g., a set of revolute pairs) are provided between the driving link 30 and the driven links 32, and also between the driven links 32 and the movable section 100.

The driving link 30 is driven by the servo-motor 28 so as to variously swing along a virtual plane extending vertically to the base section 12. The parallel driven links 32 are displaced while accompanying the swing motion of the driving links 30. In this connection, the parallel driven links 32 of one assembled-link structure 26 are connected to the parallel driven links 32 of the other two assembled-link structures 26 through the movable section 100, so that the respective parallel driven links 32 of the three assembled-link structures 26 are variously and passively swung, depending on the swinging mode of the three driving links 30.

The three assembled-link structures 26 have a configuration wherein the respective driving links 30 are connected to the base section 12 at three fixed positions spaced apart from each other by a central angle of every 120 degrees on the base section 12, and the respective driven links 32 are connected to the movable section 100 at three fixed positions spaced apart from each other by a central angle of every 120 degrees on the movable section 100. As a result, in response to the operation of the movable-section drive mechanism 16, the movable section 100 performs only the three-axis translational motion with respect to the base section 12.

Three wrist-section drive mechanisms 20 are provided respectively for three control axes for allowing the wrist section 102' to perform the orientation-changing motion (only one wrist-section drive mechanism is depicted in FIG. 2). Each of the wrist-section drive mechanisms 20 is configured as an auxiliary drive mechanism for controlling the orientation of a tool, such as a hand, etc., attached to the wrist section 102' and mounted on the movable section 100. The wrist-section drive mechanism 20 includes a holder assembly 50 configured by assembling three hollow cylindrical holders 44, 46 and 48 in a manner rotatable with respect to each other to form a triply nested structure, a servo-motor (not depicted) driving an outer holder 44 of the holder assembly 50 for rotation, and a rod-shaped transmission member 54 linearly movably received in an inner holder 48 of the holder assembly

50. The base section 12 is provided with a hollow cylindrical seat portion 56 formed to project toward the cover 24. The outer holder 44 of the holder assembly 50 is attached to the seat portion 56 through a rotational bearing unit.

Figure 3:
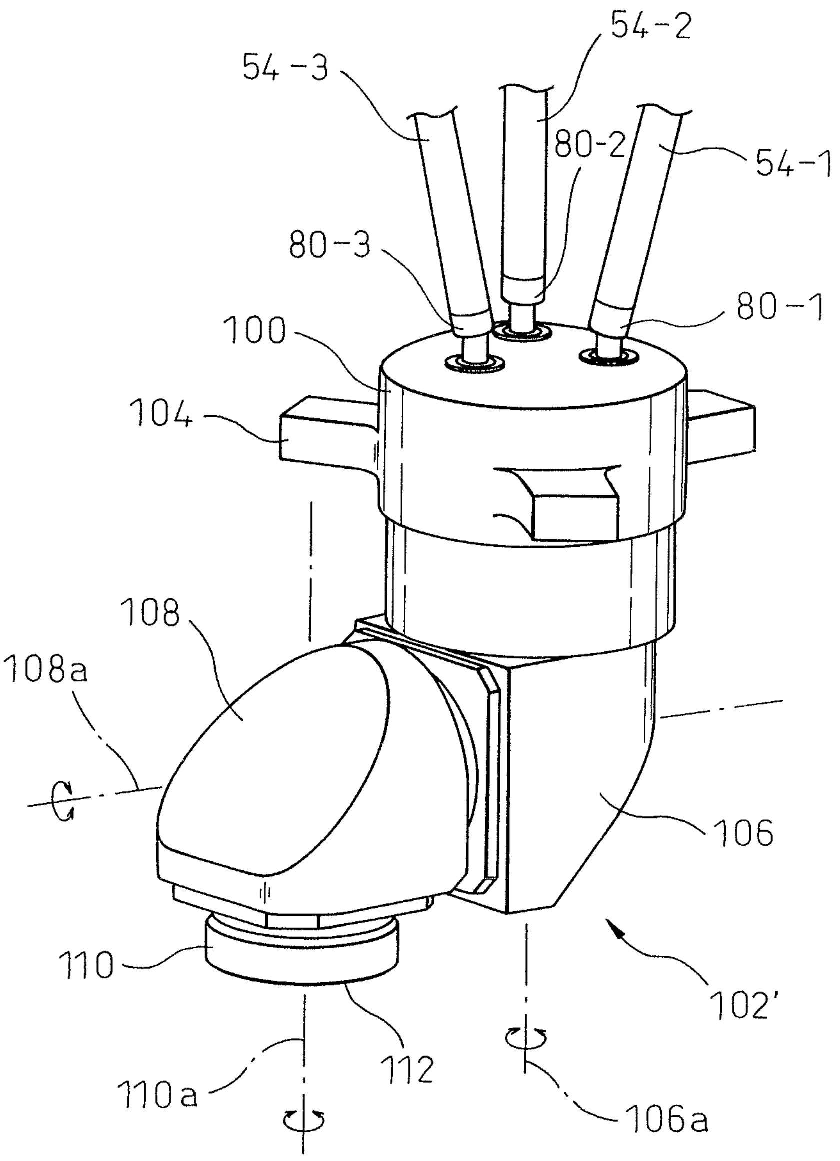
FIG. 3 is an enlarged perspective view depicting a movable section and the wrist section of the parallel robot of FIG. 1.
Figure 4:
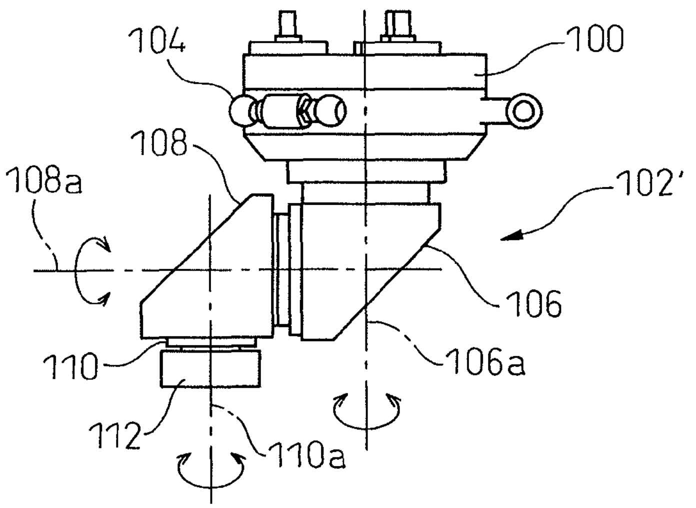
FIG. 4 is a front view of the wrist section of the parallel robot of FIG. 1.

FIGS. 3 and 4 depict the movable section 100 and wrist section 102' of the parallel robot PR. The movable section 100 is formed of a cylindrical member having a cavity part (not depicted), and is provided at three positions on the outer circumference thereof with joint parts 104, to which the parallel driven links 32 of the three assembled-link structures 26 of the movable-section drive mechanism 16 are respectively connected. Rotational bearing units and power transmission mechanisms (not depicted) are accommodated in the cavity of the movable section 100. The wrist section 102' is supported rotatably on the bottom side (in the drawing) of the movable section 100.

The wrist section 102' includes a first rotary member 106 supported on the movable section 100 and rotatable about a fourth rotation axis 106*a* different from the control axes of the three-axis translational motion of the movable section 100, a second rotary member 108 connected to the first rotary member 106 and rotatable about a fifth rotation axis 108*a* orthogonal to the fourth rotation axis 106*a*, and a third rotary member 110 connected to the second rotary member 108 and rotatable about a sixth rotation axis 110*a* orthogonal to the fifth rotation axis 108*a*. The third rotary member 110 is provided with an attachment surface 112 to which a tool or end effector, such as a hand, etc., (not depicted) is attached. The attachment surface 112 is a substantially flat surface formed orthogonal to the sixth rotation axis 110*a*.

A first one of the three wrist driving mechanisms 20 that allow the wrist section 102' to perform the three-axis orientation-changing motion, includes a first transmission member 54-1 connected to the first rotary member 106 through a first universal joint 80-1 and power transmission elements such as gear trains (not depicted). The first transmission member 54-1 operates to transmit a rotation of a first outer holder 44 driven for rotation by a first servo-motor to the first rotary member 106, and to allow the first rotary member 106 to perform a rotational motion about the fourth rotation axis 106*a*.

A second one of the three wrist-section drive mechanisms 20 includes a second transmission member 54-2 connected to the second rotary member 108 through a second universal joint 80-2 and power transmission elements such as gear trains (not depicted). The second transmission member 54-2 operates to transmit a rotation of a second outer holder 44 driven for rotation by a second servo-motor to the second rotary member 108, and to allow the second rotary member 108 to perform a rotational motion about the fifth rotation axis 108*a*.

A third one of the three wrist-section drive mechanisms 20 includes a third transmission member 54-3 connected to the third rotary member 110 through a third universal joint 80-3 and power transmission elements such as gear trains (not depicted). The third transmission member 54-3 operates to transmit a rotation of a third outer holder 44 driven for rotation by a third servo-motor to the third rotary member 110, and to allow the third rotary member 110 to perform a rotational motion about the sixth rotation axis 110*a*.

In the parallel robot PR including the wrist section 102' having three degrees of freedom, it is possible to allow a tool (not depicted) attached to the attachment surface 112 of the wrist section 102' to perform the three-axis translational motion and the three-axis rotational motion in an appropriately combined manner. As a result, the parallel robot PR can perform various tasks, such as a task for mounting a workpiece onto an inclined surface.

In the parallel robot PR including the wrist section 102' depicted in FIGS. 3 and 4, the wrist section 102' is relatively frequently controlled to be arranged at an orientation in which the fourth rotation axis 106*a* and the sixth rotation axis 110*a* are parallel to each other (in a case where the parallel robot PR is situated on a floor, an orientation in which both the fourth rotation axis 106*a* and the sixth rotation axis 110*a* are vertical to a floor surface and the attachment surface 112 is horizontal with respect to the floor surface), in order to perform a task such that, for example, the hand attached to the attachment surface 112 of the wrist section 102' is operated to grip or release a workpiece placed on a pallet or conveyor. In a state where the fourth rotation axis 106*a* and sixth rotation axis 110*a* in the wrist section 102' are parallel to each other, a rotational position of the attachment surface 112 with respect to the movable section 100 is determined by a combination of a rotational position of the fourth rotation axis 106*a* and a rotational position of the sixth rotation axis 110*a*, while, on the other hand, a rotational orientation of the attachment surface 112 with respect to the movable section 100 is maintained constant regardless of the rotational positions of the fourth rotation axis 106*a* and sixth rotation axis 110*a* (in a case where the parallel robot PR is situated on a floor, the attachment surface 112 is oriented horizontally with respect to a floor surface). Therefore, such state is regarded as a singular state (hereinafter referred to as a singularity), in which a robot movement (i.e., a solution for determining the position and orientation of a robot) for disposing a tool mounted on the movable section 100 at a target position and orientation cannot be unambiguously programmed or determined.

Figure 5:
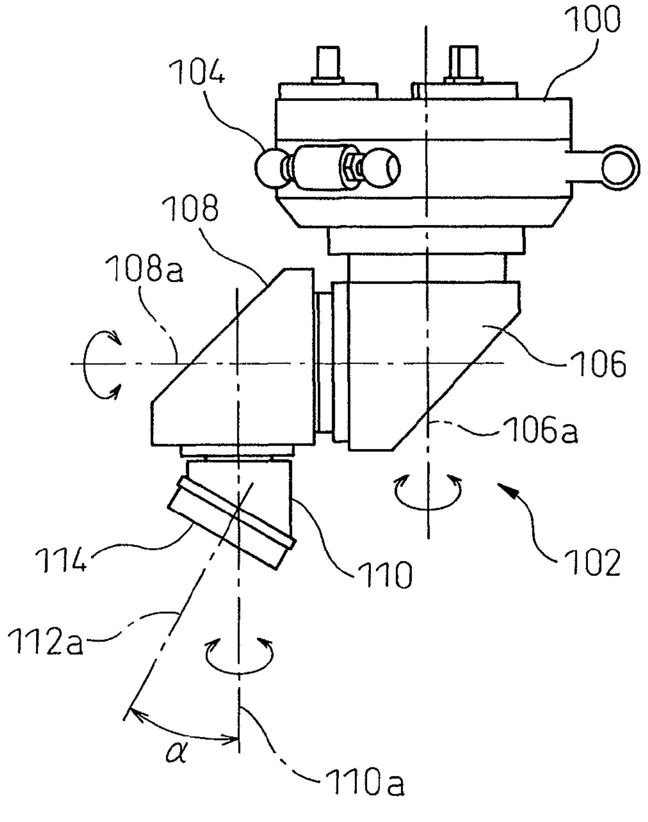
FIG. 5 is a front view of a wrist section of a parallel robot according to an embodiment of the present invention.

In contrast, in a wrist section 102 depicted in FIG. 5, which is one component of a parallel robot according to an embodiment of the present invention, a third rotary member 110 is provided with an attachment surface 114 inclined with respect to a sixth rotation axis 110*a* at a predetermined angle as depicted (in the drawing, an axial line 112*a* orthogonal to the attachment surface 114 defines a predetermined angle α with respect to the sixth rotation axis 110*a*). According to the above configuration, in a state where a fourth rotation axis 106*a* and the sixth rotation axis 110*a* are parallel to each other (i.e., in a singularity), the attachment surface 114 is inclined with respect to the rotation axes 106*a*, 110*a* as depicted. On the other hand, when the attachment surface 114 is disposed at the aforementioned orientation adapted to be relatively frequently taken (in a case where the parallel robot is situated on a floor, the orientation in which the attachment surface 114 is horizontal with respect to a floor surface), it is possible to prevent a situation (or a singularity) in which the fourth rotation axis 106*a* and the sixth rotation axis 110*a* are arranged parallel to each other from occurring, as described later. In this connection, it is preferable that the depicted predetermined angle α is, for example, at least 30 degrees and at most 60 degrees, in a case where, for example, a hand 122 (FIG. 7A) is attached to the attachment surface 114 and is operated to perform tasks.

As described above, due to a simple configuration in which the third rotary member 110 is provided with the attachment surface 114 inclined with respect to the sixth rotation axis 110*a* at a predetermined angle, it is possible to prevent the state of the wrist section 102 from reaching the singularity when the attachment surface 114 is disposed at the relatively frequently-arranged orientation (in the case where the parallel robot is situated on the floor, the orientation in which the attachment surface 114 is horizontal with respect to the floor surface). Consequently, it is possible to actualize the wrist section 102 having an inexpensive and compact structure and having control axes the respective operations of which are easily understandable. Therefore, it is possible to greatly improve the usability of the parallel robot. Further, it is not necessary for the tool, such as the hand, to take any measures for avoiding the singularity, such as providing the tool with a predetermined inclination angle. Therefore, it is possible to easily and inexpensively manufacture the tool.

Figure 6:
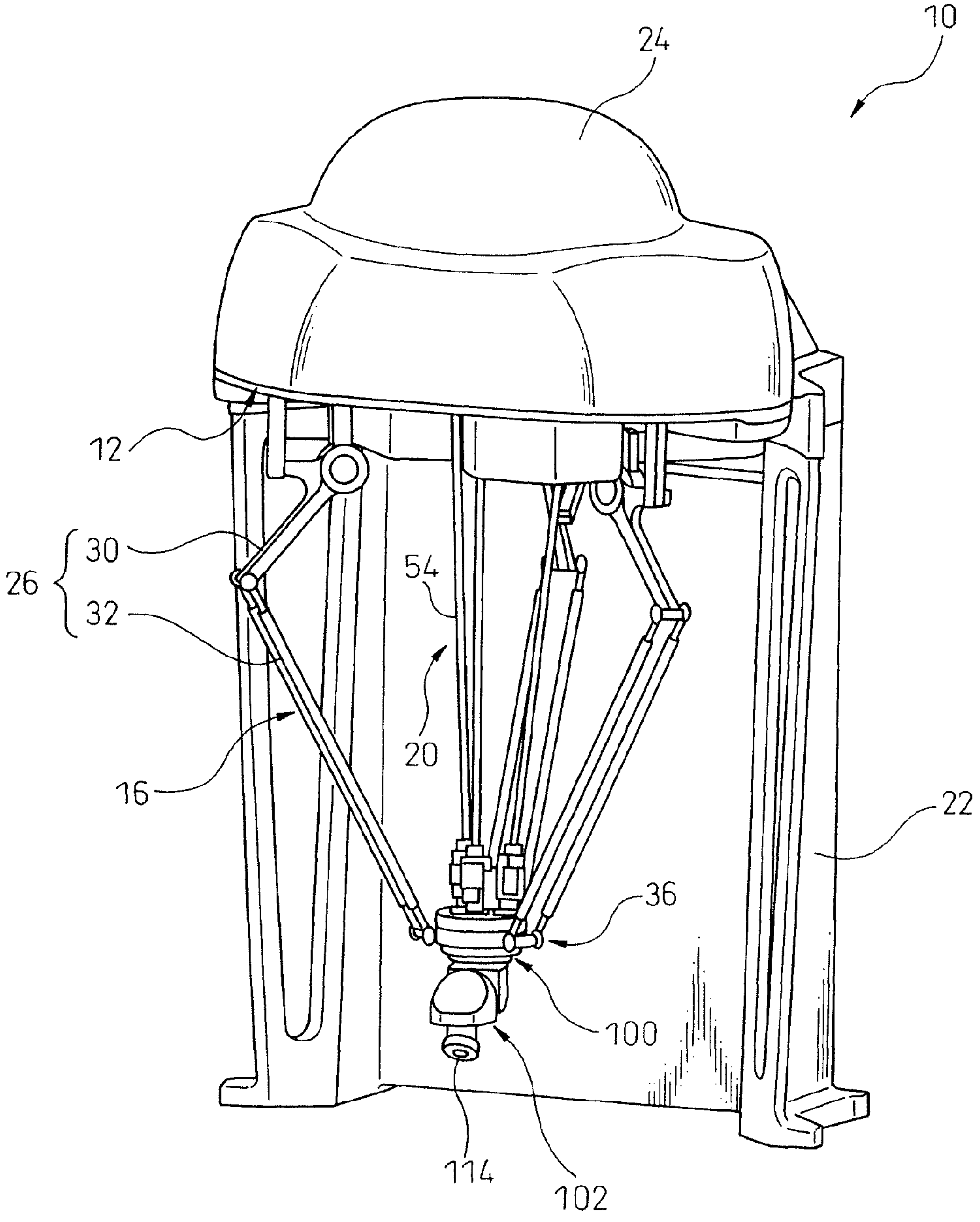
FIG. 6 is a perspective view of a parallel robot according to an embodiment of the present invention.

FIG. 6 schematically depicts an overall configuration of a parallel robot 10 according to an embodiment of the present invention and including the wrist section 102. The parallel robot 10 has a configuration substantially identical to that of the parallel robot PR depicted in FIGS. 1 to 4, except for the configuration of the wrist section 102, and thus corresponding components are denoted by the same reference numerals and the descriptions thereof are not repeated. In the parallel robot 10, a hand 122 (see FIGS. 7A and 7B) for performing tasks such as gripping and transferring a workpiece (not depicted) can be attached to the attachment surface 114 of the wrist section 102. In this case, an attachment part 120 provided in the hand 122 is fitted to the attachment surface 114.

Figure 7A:
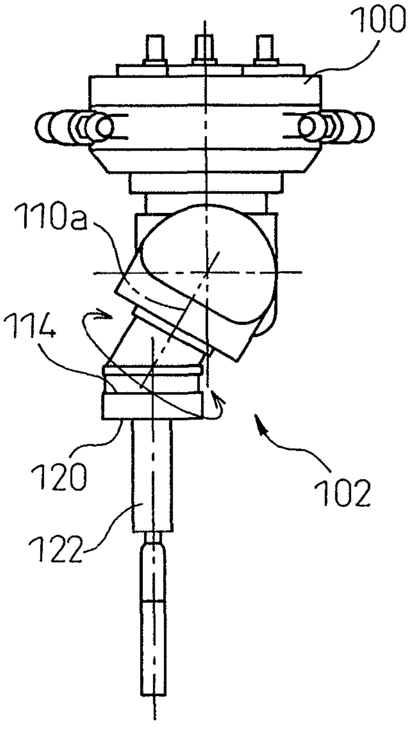
FIGS. 7A and 7B are illustrations explaining a state where a hand is attached to the wrist section of FIG. 5.
Figure 7B:
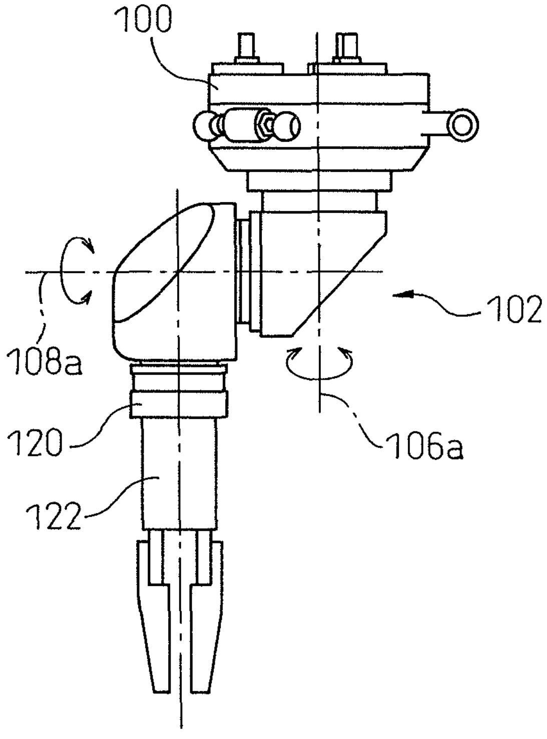

For example, in a system configuration in which the parallel robot 10 is situated on a floor, when a workpiece placed on a workpiece-support surface of a pallet or conveyor, which extends horizontally with respect to the floor surface, should be gripped, it is generally performed to orient a fingertip of the hand 122 immediately beneath. In the parallel robot 10 including the wrist section 102, in order to locate the attachment surface 114 horizontally with respect to the floor surface and thus to orient the fingertip of the hand 122 immediately below, an operation is performed, in which, starting from a state where the fourth rotation axis 106*a* and the sixth rotation axis 110*a* are parallel to each other (FIG. 5), a fifth rotation axis 108*a* is rotated by a predetermined angle (corresponding to the aforementioned predetermined angle $\alpha$) and the sixth rotation axis 110*a* is rotated by a predetermined angle (FIGS. 7A and 7B). As a result, in the state where the fingertip of the hand 122 is oriented immediately below, the fourth rotation axis 106*a* and the sixth rotation axis 110*a* are not parallel to each other, and it is thus possible to prevent the state of the wrist section 102 from falling into the singularity.

Figure 8B:
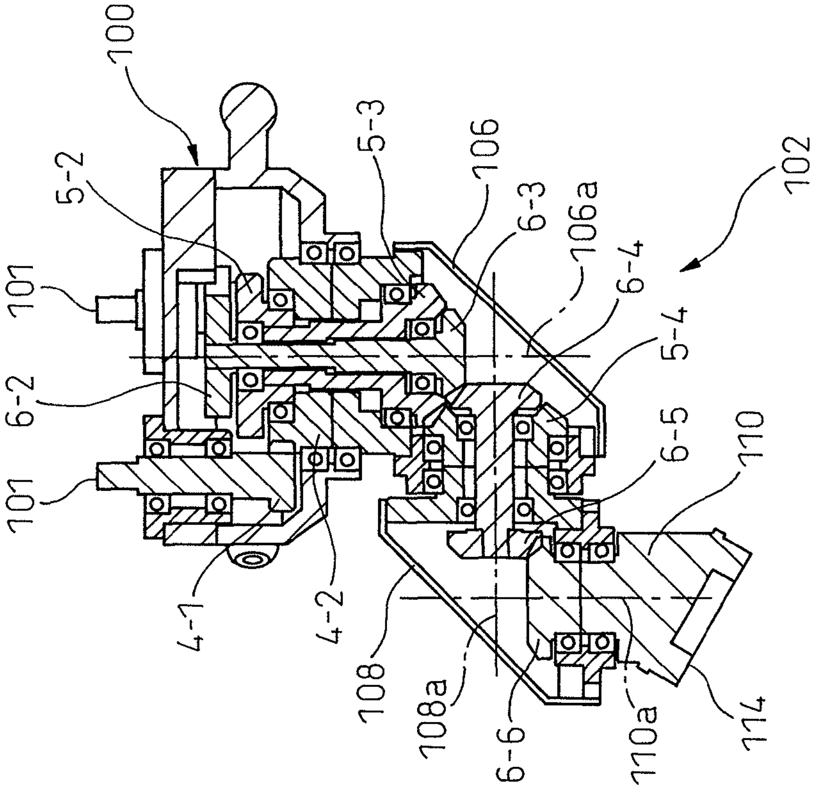
Figure 8A:
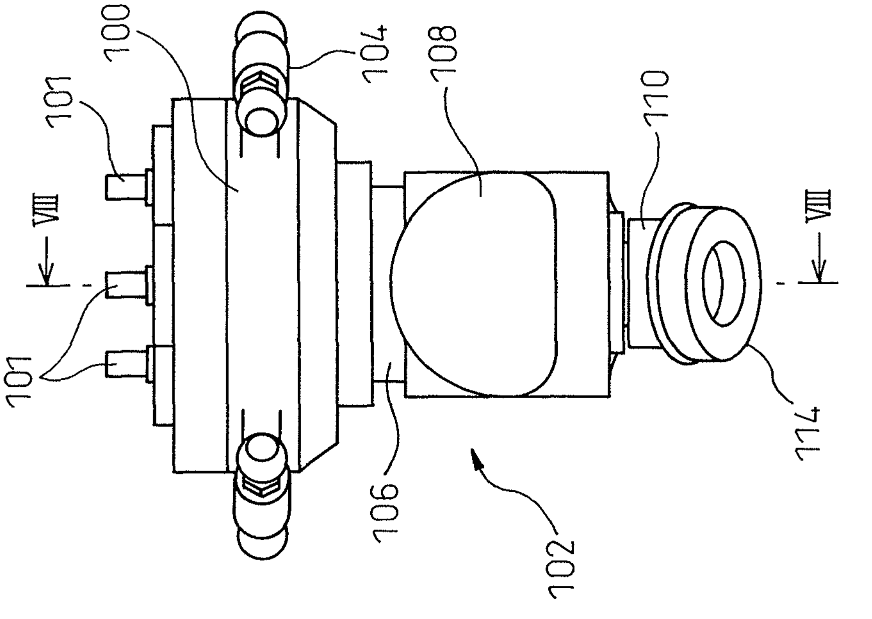

Referring to FIGS. 8A and 8B, the structure of the wrist section 102 is described in more detail. As already described with reference to FIG. 3, a driving force for driving the wrist section 102 for rotation is transmitted from the servo-motors 52 of mutually-independent three wrist-section drive mechanisms 20 to the wrist section 102 through the transmission members 54-1, 54-2, 54-3 of the respective wrist-section drive mechanisms 20. The wrist section 102 includes three input shaft members 101 rotatably supported on a cylindrical movable section 100 through rotational bearing units. All of the input shaft members 101 are adapted to rotate about axial lines parallel to the fourth rotation axis 106*a*. The driving force for rotating the wrist section 102 are transmitted from the transmission members 54-1, 54-2, 54-3 of the three wrist-section drive mechanisms 20 to the three input shaft members 101 through universal joints 80-1, 80-2, 80-3, respectively.

Gears 4-1, 5-1, 6-1 are respectively secured to the distal ends of the input shaft members 101 (gears 5-1 and 6-1 are not depicted). A hollow-tubular first driven gear 4-2 is fixed to a first rotary member 106. The first driven gear 4-2 (and thus the first rotary member 106) is coupled or geared to a first one of the input shaft members 101, and rotatably supported on the movable section 100 through a rotational bearing unit. The gear 4-1 is engaged with the first driven gear 4-2 and thereby a rotational driving force transmitted to the gear 4-1 of the first input shaft member 101 is in turn transmitted to the first driven gear 4-2, so that the first rotary member 106 is operated to rotate about the fourth rotation axis 106*a*.

Inside the first driven gear 4-2 of the first rotary member 106, two hollow-tubular gears 5-2, 5-3 are rotatably supported through rotational bearing units. The gears 5-2, 5-3 are integrally fixed to each other so that a driving force can be transmitted therebetween, and thereby constitute a first intermediate gear. A hollow-tubular second driven gear 5-4 is fixed to a second rotary member 108. The second driven gear 5-4 (and thus the second rotary member 108) is coupled or geared to a second one of the input shaft members 101 through the first intermediate gear (i.e., the gears 5-2, 5-3), and rotatably supported on the first rotary member 106 through a rotational bearing unit. A rotational driving force transmitted to the gear 5-1 (not depicted) of the second input shaft member 101 is in turn transmitted to the second driven gear 5-4 through the first intermediate gear (i.e., the gears 5-2, 5-3), so that the second rotary member 108 is operated to rotate about the fifth rotation axis 108*a*.

Inside the first intermediate gear (i.e., the gears 5-2, 5-3), a second intermediate gear 6-3 including a shaft part with a gear 6-2 secured to the end of the shaft part is rotatably supported through a rotational bearing unit. Inside the second driven gear 5-4, a third intermediate gear 6-4 including a shaft part with a gear 6-5 secured to the end of the shaft part is rotatably supported through a rotational bearing unit. A third driven gear 6-6 is fixed to the third rotary member 110. The third driven gear 6-6 (and thus the third rotary member 110) is coupled or geared to a third one of the input shaft members 101 through the second intermediate gear 6-3 and the third intermediate gear 6-4. The third rotary member 110 and the third driven gear 6-6 are rotatably supported on the second rotary member 108 through a rotational bearing unit. A rotational driving force transmitted to the gear 6-1 (not depicted) of the third input shaft member 101 is in turn transmitted to the third driven gear 6-6 through the gear 6-2 and the second intermediate gear 6-3 as well as the gear 6-5 and the third intermediate gear 6-4, so that the third rotary member 110 is operated to rotate about the sixth rotation axis 110*a*. In this connection, means for fixing the gears to each other and means for fixing the gears to the rotary members may be suitably selected from among various fixing means, such as bolts, keys, adhesives, etc., provided that the fixing means can transmit the driving force between the mutually fixed components.

Figure 9A:
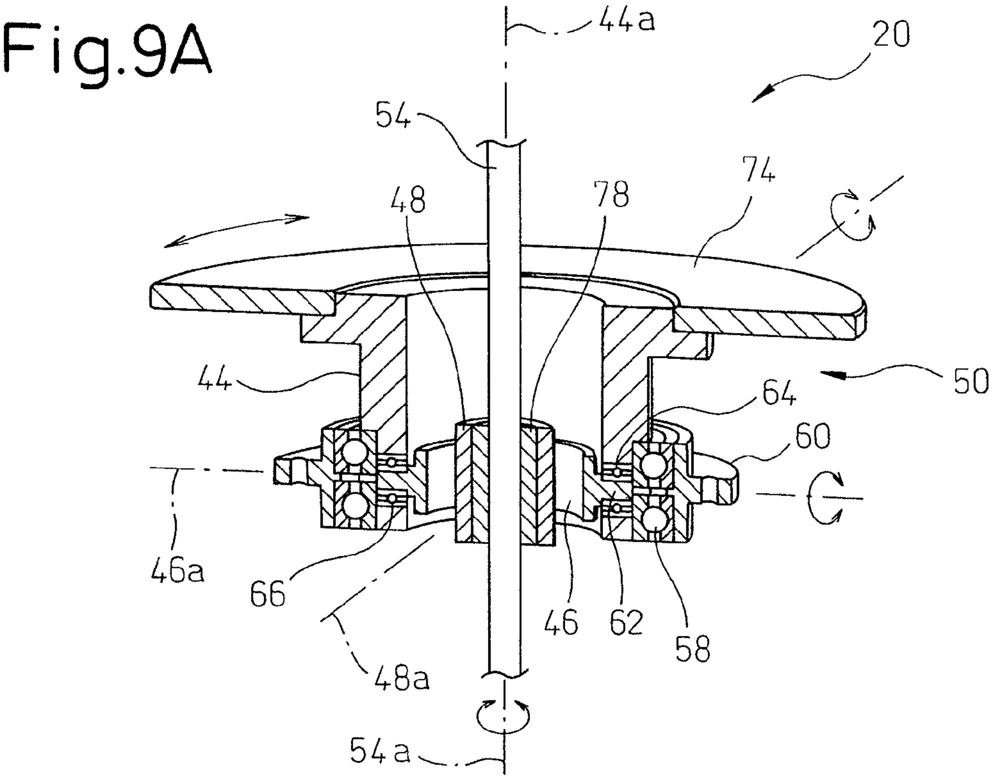
Figure 9B:
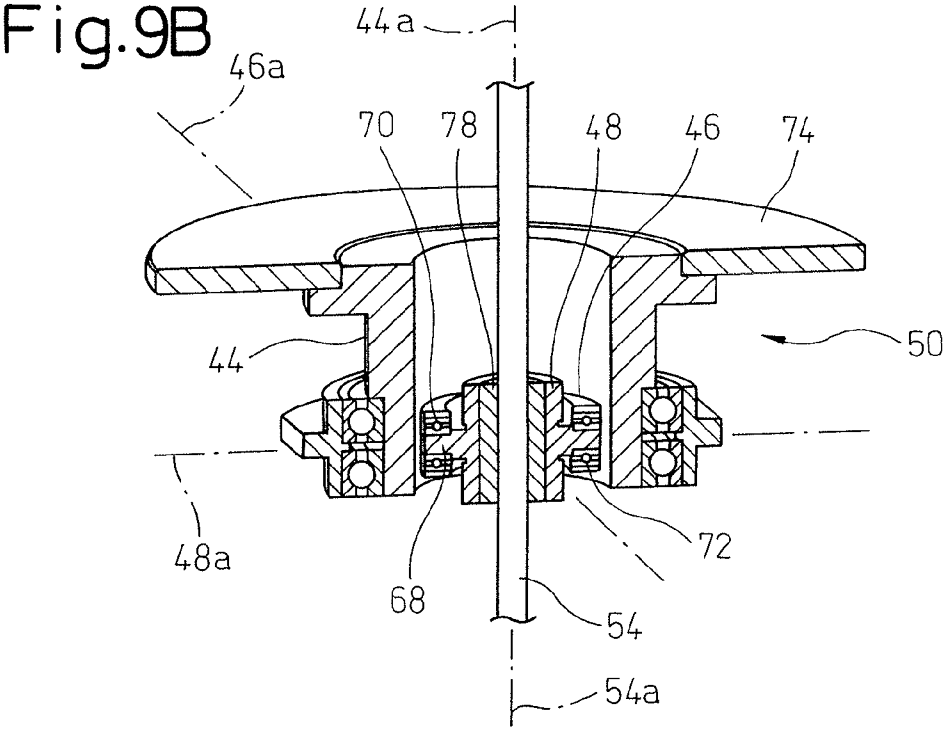
Figure 10:
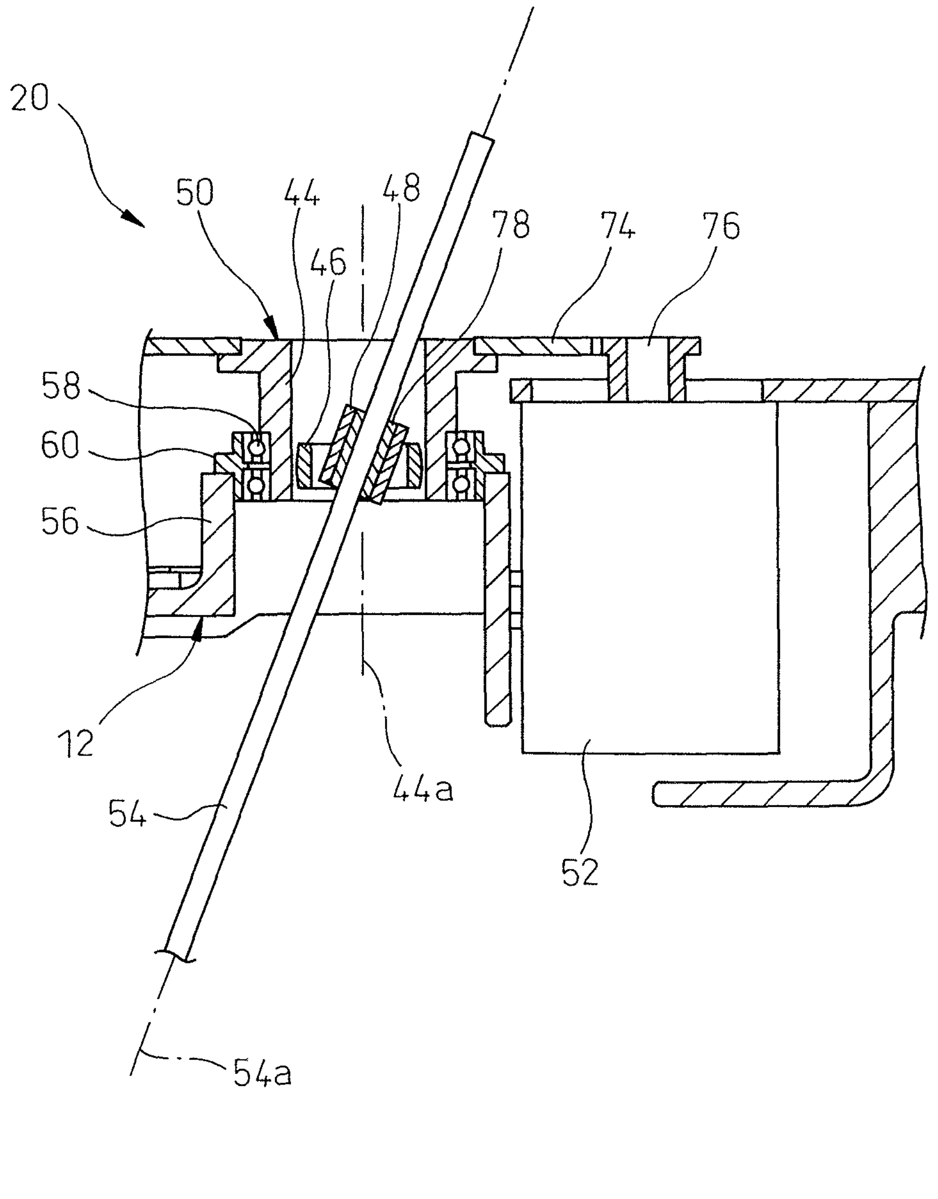
FIG. 10 is an enlarged view of the major portion of the wrist-section drive mechanism of FIG. 9A.
Figure 11:
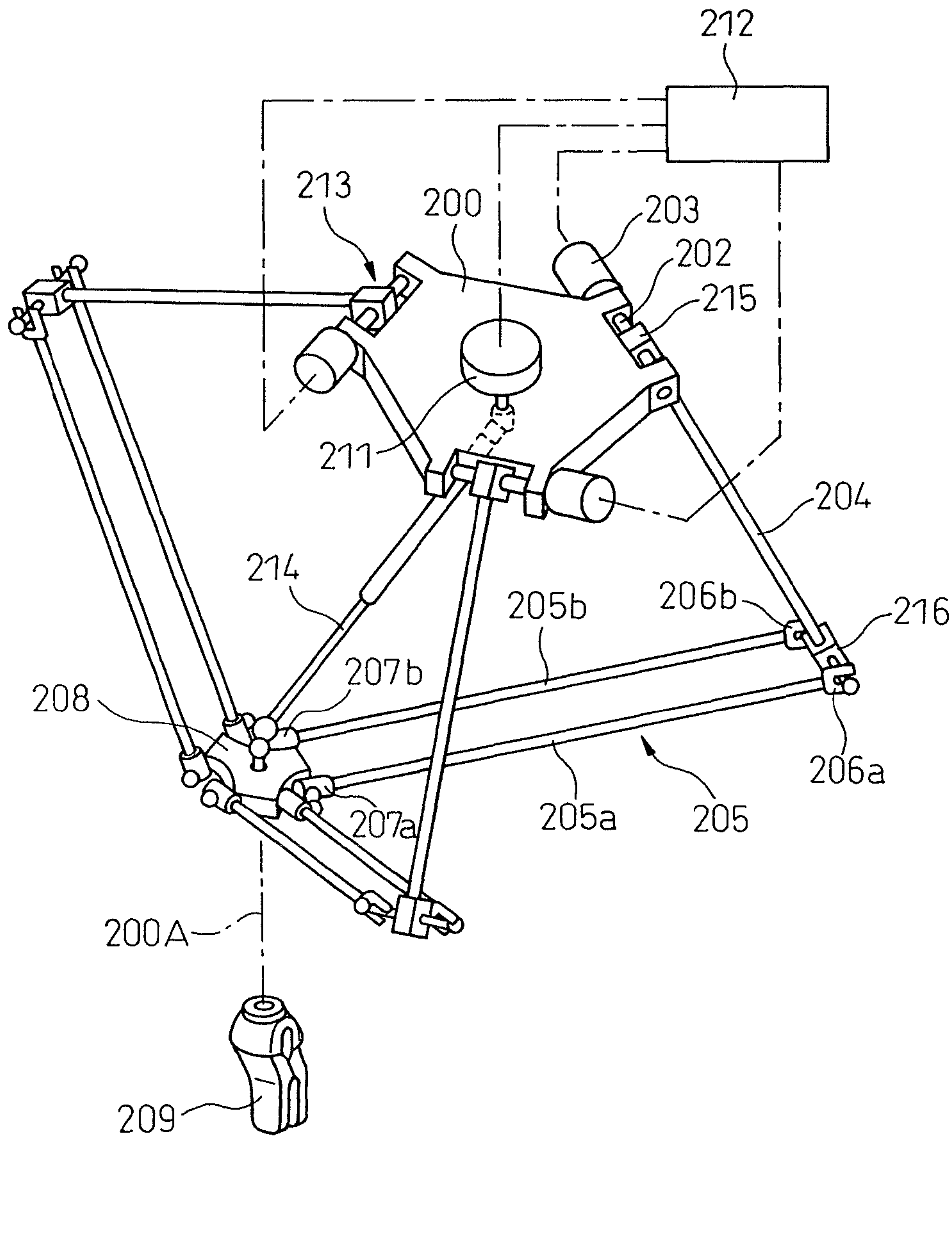
FIG. 11 is a schematic perspective view of a conventional parallel robot.

FIGS. 9A to 10 depict a major portion of the wrist-section drive mechanism 20. The wrist-section drive mechanism 20 is configured as a drive mechanism for controlling the orientation of the tool, such as the hand (FIGS. 7A and 7B), attached to the wrist section 102 and mounted on the movable section 100. The parallel robot 10 according to an embodiment of the present invention is provided with three wrist-section drive mechanisms 20 capable of operating independently of each other. The base section 12 is provided with three seat portions 56, each of which is configured as depicted in FIG. 2, and which are formed at appropriate positions around the substantial center of the three assembled-link structures 26. The outer holders 44 of the respective holder assemblies 50 are attached to the corresponding seat portions 56. As a result, the three wrist-section drive mechanisms 20 are arranged so that the first rotation axes 44*a* of the respective holder assemblies 50 are parallel to each other.

Each wrist-section drive mechanism 20 includes a holder assembly 50 configured by assembling three hollow cylindrical holders 44, 46 and 48 in a manner rotatable with respect to each other to form a triply nested structure, a servo-motor 52 driving an outer holder 44 of the holder assembly 50 for rotation, and a rod-shaped transmission member 54 linearly movably received in an inner holder 48 of the holder assembly 50.

The outer holder 44 of the holder assembly 50 is attached to the seat portion 56 through a rotational bearing unit 58. In the illustrated embodiment, the inner ring of the rotational bearing unit 58 is fixed to one axial-end region (a bottom-end region, in the drawing) of the outer circumferential surface of the outer holder 44, the outer ring of the rotational bearing unit 58 is fixed to the inner circumferential surface of a hollow cylindrical attachment member 60, and the attachment member 60 is fixed to one axial end (a top end, in the drawing) of the seat portion 56 (FIG. 10). In this state, the outer holder 44 is connected to the base section 12 and rotatable about a first rotation axis 44*a* extending vertically with respect to the base section 12 (i.e., with respect to the mounting surface for the parallel robot 10) with the internal space of the outer holder 44 being coaxially and juncturally arranged with respect to the internal space of the seat portion 56. In the illustrated embodiment, the first rotation axis 44*a* coincides with a geometrical center line of the cylindrical outer holder 44. The outer ring of the rotational bearing unit 58 may be directly fixed to the seat portion 56 without using the attachment member 60.

As depicted in FIG. 9A, the intermediate holder 46 of the holder assembly 50 is provided with an outer circumferential surface having a diameter smaller than the diameter of the inner circumferential surface of the outer holder 44 and a pair of spindles 62 projecting axially outward and formed at predetermined mutually-opposite positions spaced from each other by a central angle of 180 degrees on the outer circumferential surface of the intermediate holder 46. The spindles 62 are disposed so that the geometrical center lines thereof coincide with each other and extend orthogonally to the geometrical center line of the intermediate holder 46. On the other hand, the outer holder 44 is provided with a pair of spindle holes 64 penetrating radially therethrough and formed at predetermined mutually-opposite positions spaced from each other by a central angle of 180 degrees on the inner circumferential surface of the outer holder 44. The spindle holes 64 are disposed so that the geometrical center lines thereof coincide with each other and extend orthogonally to the geometrical center line of the outer holder 44.

The intermediate holder 46 is attached to the outer holder 44 through a pair of rotational bearing units 66 respectively provided in the spindle holes 64, with the spindles 62 of the intermediate holder 46 being respectively inserted into the corresponding spindle holes 64 of the outer holder 44. More specifically, the inner ring of each rotational bearing unit 66 is fixed to the outer circumferential surface of each spindle 62 of the intermediate holder 46, and the outer ring of each rotational bearing unit 66 is fixed to the inner circumferential surface of each spindle hole 64 of the outer holder 44. In this state, the intermediate holder 46 is provided inside the outer holder 44 and rotatable about a second rotation axis 46*a* orthogonal to both the geometrical center line of the intermediate holder 46 and the first rotation axis 44*a*.

As depicted in FIG. 9B, the inner holder 48 of the holder assembly 50 is provided with an outer circumferential surface having a diameter smaller than the diameter of the inner circumferential surface of the intermediate holder 46 and a pair of spindles 68 projecting radially outward and formed at predetermined mutually-opposite positions spaced from each other by a central angle of 180 degrees on the outer circumferential surface of the inner holder 48. The spindles 68 are disposed so that the geometrical center lines thereof coincide with each other and extend orthogonally to the geometrical center line of the inner holder 48. On the other hand, the intermediate holder 46 is provided with a pair of spindle holes 70 penetrating radially therethrough and formed at predetermined mutually-opposite positions spaced from each other by a central angle of 180 degrees and also spaced from the pair of spindles 62 by a central angle of 90 degrees. The spindle holes 70 are disposed so that the geometrical center lines thereof coincide with each other and extend orthogonally to the geometrical center line of the intermediate holder 46.

The inner holder 48 is attached to the intermediate holder 46 through a pair of rotational bearing units 72 respectively provided in the spindle holes 70, with the spindles 68 of the inner holder 48 being respectively inserted into the corresponding spindle holes 70 of the intermediate holder 46. More specifically, the inner ring of each rotational bearing unit 72 is fixed to the outer circumferential surface of each spindle 68 of the inner holder 48, and the outer ring of each rotational bearing unit 72 is fixed to the inner circumferential surface of each spindle hole 70 of the intermediate holder 46. In this state, the inner holder 48 is provided inside the intermediate holder 46 and rotatable about a third rotation axis 48*a* orthogonal to both the geometrical center line of the inner holder 48 and the second rotation axis 46*a*.

A gear 74 as a power transmission element is fixed to the other axial end (a top end, in the drawing) of the outer circumferential surface of the outer holder 44. An output shaft 76 of the servo-motor 52 is meshed with the gear 74 (FIG. 10). The servo-motor 52 drives the outer holder 44 through the gear 74 so as to rotate about the first rotation axis 44*a*. Alternatively, in place of the gear 74, a belt and a pulley may be used as the power transmission element.

The transmission member 54 is a monolithic or single-piece rod-shaped element provided with an outer circumferential surface having a diameter smaller than the diameter of the inner circumferential surface of the inner holder 48 of the holder assembly 50, and is attached to the inner holder 48 through a linear bearing member 78 provided inside the inner holder 48. In this state, the transmission member 54 is received in the inner holder 48 and linearly movable over the entire length of the transmission member 54 in a rotationally restrained state, along a linear-motion axis 54*a* parallel to the geometrical center lines of both the transmission member 54 and the inner holder 48 and orthogonal to the third rotation axis 48*a*. In the illustrated embodiment, the linear-motion axis 54*a* coincides with the geometrical center lines of both the transmission member 54 and the inner holder 48.

In order to improve accuracy in tool orientation control, it is necessary that the linear bearing member 78 guiding the transmission member 54 in a rotationally restrained state can transmit the output power of the servo-motor 52 to the transmission member 54 while eliminating loss of power as much as possible. From this viewpoint, a spline nut of a ball spline unit can be preferably used as the linear bearing member 78. In this case, the transmission member 54 has a configuration of a spline shaft of the ball spline unit. The ball spline unit is known in the art and thus is not described herein in detail.

The holder assembly 50 acts as a universal joint arranged between the transmission member 54 and the base section 12 or the output shaft 76 of the servo-motor 52 and having a special configuration capable of performing a relative motion along the geometrical center line (or the linear-motion axis 54*a*) of the transmission member 54. More specifically, the outer holder 44 is a driving-side component of the special universal joint and the inner holder 48 is a driven-side component of the special universal joint. Therefore, in either a positional relationship wherein the linear-motion axis 54*a* is parallel to the first rotation axis 44*a* of the outer holder 44 or a positional relationship wherein the linear-motion axis 54*a* is oblique to the first rotation axis 44*a*, the transmission member 54 can rotate together or integrally with the inner holder 48 about the linear-motion axis 54*a* in synchronization with the rotation of the outer holder 44 driven by the prime mover 52.

In the holder assembly 50, the allowable inclination angle of the transmission member 54 with respect to the outer holder 44 (i.e., of the linear-motion axis 54*a* with respect to the first rotation axis 44*a*) is determined by the relative positional and dimensional relationship among the outer holder 44, the intermediate holder 46 and the inner holder 48. In the typical work of the parallel robot 10 (e.g., a handling work), it is desirable that the transmission member 54 can be inclined in the range of about 0 to 40 degrees. As depicted in the drawings, the holder assembly 50 configured by assembling three hollow cylindrical holders 44, 46, 48 to form a triply nested structure can be constructed in such a manner that the intermediate holder 46 and the inner holder 48 do not substantially protrude outward from the outer holder 44. Therefore, it is possible to easily reduce the overall dimensions of the holder assembly 50 without impairing the required ability of the universal joint.

As described with reference to FIG. 3, the transmission member 54 (54-1, 54-2, 54-3) is swingably connected, at one end (a bottom end, in the drawing) spaced from the inner holder 48 of the holder assembly 50, to the wrist section 102 through a universal joint 80 (80-1, 80-2 and 80-3) having a typical structure. In this configuration, the transmission member 54 operates to smoothly transmit the rotation of the outer holder 44 about the first rotation axis 44*a* of the holder assembly 50 to the wrist section 102, and to allow the first rotary member 106 of the wrist section 102 about the fourth rotation axis 106*a* orthogonal to the third rotation axis 48*a* of the holder assembly 50.

In particular, in the parallel robot 10, the transmission member 54 can smoothly follow the three-axis translational motion of the movable section 100 and the wrist section 102 obtained by the movable-section drive mechanism 16 having the parallel mechanism configuration, and thus can passively move along the linear-motion axis 54*a* with respect to the holder assembly 50 as a universal joint arranged between the transmission member 54 and the base section 12 or the prime-mover output shaft 76. As a result, when the movable section 100 and the wrist section 102 are located at a desired (or commanded) spatial position within the operational space thereof, the torque of the servo-motor 52 can be reliably transmitted to the wrist section 102.

In this connection, as described above, the movable-section drive mechanism 16 drives the movable section 100 so that the movable section 100 performs only the three-axis translational motion with respect to the base section 12. Therefore, during the operation of the movable-section drive mechanism 16, the fourth rotation axis 106*a* of the wrist section 102 is always disposed parallel to the first rotation axis 44*a* of the holder assembly 50. As a result, the angular velocity of the outer holder 44 corresponds to the angular velocity of the input shaft member 101 of the wrist section 102, regardless of the inclination angle of the transmission member 54 with respect to the base section 12.

In the configuration described above, when the transmission member 54 follows the three-axis translational motion of the movable section 100 and the wrist section 102, the transmission member 54 tends to protrude upward from the outer holder 44 of the holder assembly 50 carried on the base section 12 in various angles and by various lengths. Therefore, in order to avoid interference between the servo-motor 52 and the transmission member 54, it is advantageous that the servo-motor 52 of the wrist-section drive mechanism 20 is carried on the base section 12 at a position adjacent to the outer holder 44 so as not to protrude beyond the outer holder 44 in a direction (an upward direction, in the drawing) away from the movable section 100 (see FIG. 10).

As apparent from the above description, the parallel robot 10 according to the illustrated embodiment has a configuration in which the number of degrees of freedom regarding the orientation change axes of the wrist section 102 is increased to three degrees, so that various tasks, such as a task for mounting a workpiece to an inclined surface, can be performed. Further, the parallel robot 10 can prevent the occurrence of a singular state (or a singularity) where a robot movement for disposing a tool mounted on the wrist section 102 (or the movable section 100) at a target position and orientation cannot be unambiguously programmed or determined, even when the attachment surface 114 of the wrist section 102 is disposed at a relatively frequently-taken orientation (in a case where the parallel robot 10 is situated on the floor, the orientation in which the attachment surface 114 is horizontal with respect to a floor surface).

Figure 12:
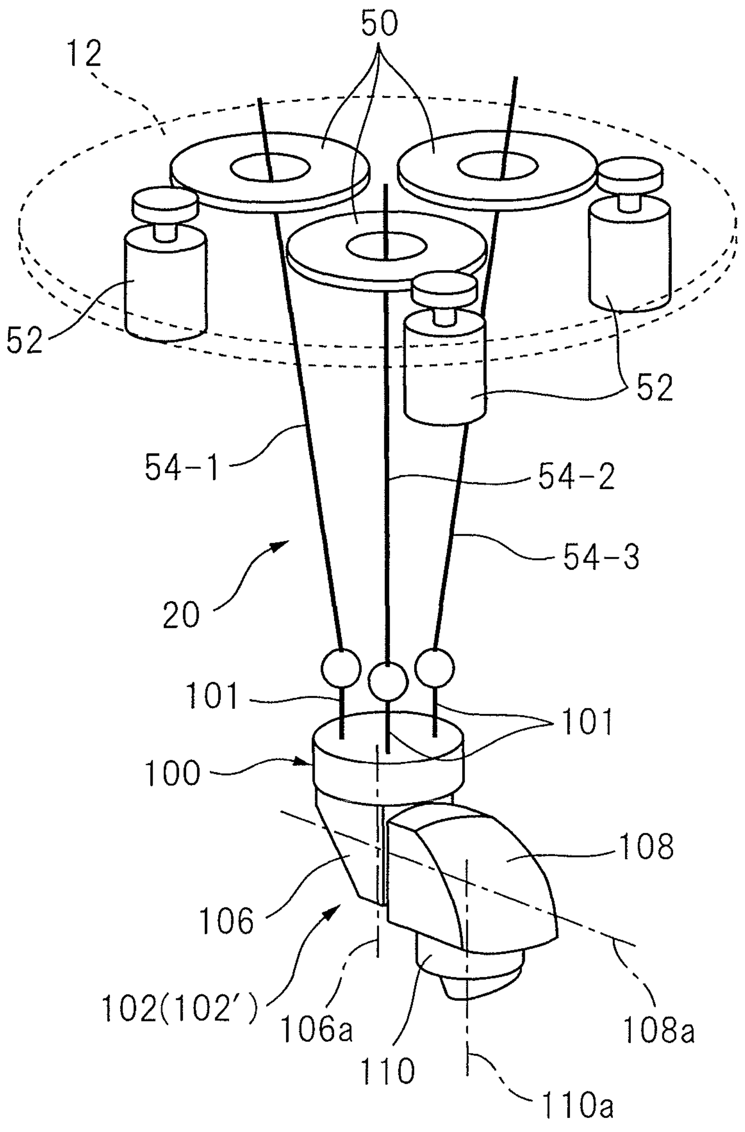
FIG. 12 is a schematic illustration depicting a parallel robot according to an embodiment of the present invention, which includes the wrist section shown in FIG. 4 or 5.

FIG. 12 schematically depicts a parallel robot according to an embodiment of the present invention. The illustrated parallel robot has a configuration substantially identical to that of the parallel robot PR or 10 depicted in FIGS. 1 to 11. However, in FIG. 12, wall 22, cover 24 and movable-section drive mechanism 16 (FIG. 1 or 6) are not depicted, and base section 12 is depicted by a broken line.

The illustrated parallel robot includes a base section 12; a movable section 100 capable of moving with respect to the base section 12; a movable-section drive mechanism 16 having a parallel mechanism configuration and provided between the base section 12 and the movable section 100, the movable-section drive mechanism 16 operating to allow the movable section 100 to perform a three-axis translational motion with respect to the base section 12; a wrist section 102' or 102 provided in the movable section 100 in a manner capable of changing an orientation of the wrist section 102' or 102; and a wrist-section drive mechanism 20 operating to allow the wrist section 102' or 102 to perform a three-axis orientation-changing motion with respect to the movable section 100. The wrist section 102' or 102 includes a first rotary member 106 supported on the movable section 100 and rotatable about a fourth rotation axis 106*a* different from axes of the three-axis translational motion of the movable section 100; a second rotary member 108 connected to the first rotary member and rotatable about a fifth rotation axis 108*a* orthogonal to the fourth rotation axis 106*a*; a third rotary member 110 connected to the second rotary member 108 and rotatable about a sixth rotation axis 110*a* orthogonal to the fifth rotation axis 108*a*; and a first input shaft member 101, a second input shaft member 101 and a third input shaft member 101, rotatably supported on the movable section 100 and connected respectively to the first rotary member 106, the second rotary member 108 and the third rotary member 110 through gears (see FIG. 8B). The wrist-section drive mechanism 20 includes a first servo-motor 52, a second servo-motor 52 and a third servo-motor 52, which are carried on the base section 12 (see FIG. 10) and respectively generate driving force to drive the wrist section 102' or 102 for rotation; and a first transmission member 54-1, a second transmission member 54-2 and a third transmission member 54-3, transmitting the driving force of the first servo-motor 52, the second servo-motor 52 and the third servo-motor 52, respectively to the first input shaft member 101, the second input shaft member 101 and the third input shaft member 101. The first servo-motor 52, the second servo-motor 52 and the third servo-motor 52 respectively drive the first rotary member 106, the second rotary member 108 and the third rotary member 110 for rotation.

While the invention has been described with reference to specific preferred embodiments, it will be understood, by those skilled in the art, that various changes or modifications may be made thereto without departing from the scope of the following claims.

The invention claimed is:

1. A parallel robot comprising:

a base section;

a movable section capable of moving with respect to said base section;

a movable-section drive mechanism having a parallel mechanism configuration and provided between said base section and said movable section, said movable-section drive mechanism operating to allow said movable section to perform a three-axis translational motion with respect to said base section;

a wrist section provided in said movable section in a manner capable of changing an orientation of the wrist section; and a wrist-section drive mechanism operating to allow said wrist section to perform a three-axis orientation-changing motion with respect to said movable section, wherein said wrist section comprises:

a first rotary member supported on said movable section and rotatable about a fourth rotation axis different from axes of said three-axis translational motion of said movable section;

a second rotary member connected to said first rotary member and rotatable about a fifth rotation axis orthogonal to said fourth rotation axis;

a third rotary member connected to said second rotary member and rotatable about a sixth rotation axis orthogonal to said fifth rotation axis; and a first input shaft member, a second input shaft member and a third input shaft member, rotatably supported on said movable section and connected respectively to said first rotary member, said second rotary member and said third rotary member through gears;

wherein said wrist-section drive mechanism comprises:

a first servo-motor, a second servo-motor and a third servo-motor, which are carried on said base section and respectively generate driving force to drive said wrist section for rotation; and a first transmission member, a second transmission member and a third transmission member, transmitting the driving force of said first servo-motor, said second servo-motor and said third servo-motor, respectively to said first input shaft member, said second input shaft member and said third input shaft member;

said first servo-motor, said second servo-motor and said third servo-motor respectively driving said first rotary member, said second rotary member and said third rotary member for rotation.

* * * * *